(12) United States Patent
Wang et al.

(10) Patent No.: US 11,774,654 B2
(45) Date of Patent: Oct. 3, 2023

(54) SUBSTRATE, MASK, DISPLAY PANEL AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Xiongwei Wang, Beijing (CN); Baojie Zhao, Beijing (CN); Jian Li, Beijing (CN); Li Wang, Beijing (CN); Xiang Hui, Beijing (CN); Yan Zhao, Beijing (CN); Qinglin Ma, Beijing (CN); Chunhong Ma, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 526 days.

(21) Appl. No.: 16/757,532

(22) PCT Filed: Oct. 29, 2018

(86) PCT No.: PCT/CN2018/112369
§ 371 (c)(1),
(2) Date: Apr. 20, 2020

(87) PCT Pub. No.: WO2019/161675
PCT Pub. Date: Aug. 29, 2019

(65) Prior Publication Data
US 2021/0191018 A1   Jun. 24, 2021

(30) Foreign Application Priority Data
Feb. 23, 2018 (CN) .......................... 201820263209.0

(51) Int. Cl.
*G02B 5/28* (2006.01)
*B32B 37/26* (2006.01)
(Continued)

(52) U.S. Cl.
CPC ................ *G02B 5/28* (2013.01); *B32B 37/26* (2013.01); *B32B 43/006* (2013.01);
(Continued)

(58) Field of Classification Search
None
See application file for complete search history.

(56) References Cited

U.S. PATENT DOCUMENTS

2011/0007251 A1\* 1/2011 Yamamoto ............ G02F 1/1339
349/108
2014/0055728 A1   2/2014 Oono
(Continued)

FOREIGN PATENT DOCUMENTS

| CN | 106959549 | 7/2017 |
|----|-----------|--------|
| CN | 107589588 | 1/2018 |
| CN | 207992626 | 10/2018 |

OTHER PUBLICATIONS

International Search Report from PCT/CN2018/112369 dated Feb. 13, 2019.
Written Opinion from PCT/CN2018/112369 dated Feb. 13, 2019.

*Primary Examiner* — Francisco W Tschen
*Assistant Examiner* — Abhishek A Patwardhan
(74) *Attorney, Agent, or Firm* — Calfee, Halter & Griswold LLP

(57) ABSTRACT

A substrate, a mask, a display panel and a display device are provided. The substrate includes a base substrate and a color resistance layer on the base substrate. The substrate has a display area and a non-display area. The color resistance layer in the non-display area includes a weakening unit for
(Continued)

weakening or disconnecting connection between the color resistance layer in the non-display area away from the display area and the color resistance layer in the display area. During the development and washing process of the substrate, even if the color resistance layer in the non-display area is peeled off, the color resistance layer in the display area will not be peeled off together, which helps to ensure the safety and reliability of the color resistance layer in the display area.

17 Claims, 3 Drawing Sheets

(51) Int. Cl.
*B32B 43/00* (2006.01)
*G02F 1/1335* (2006.01)

(52) U.S. Cl.
CPC ... *B32B 2037/268* (2013.01); *B32B 2307/402* (2013.01); *G02F 1/133516* (2013.01)

(56) References Cited

U.S. PATENT DOCUMENTS

| | | | |
|---|---|---|---|
| 2018/0031910 A1* | 2/2018 | Li | G02F 1/13394 |
| 2018/0180920 A1* | 6/2018 | Zhang | H01L 27/1248 |
| 2020/0310184 A1* | 10/2020 | Imai | G02F 1/133514 |

* cited by examiner

SUBSTRATE, MASK, DISPLAY PANEL AND DISPLAY DEVICE

RELATED APPLICATION

The present application is a 35 U.S.C. 371 national stage application of a PCT International Application No. PCT/CN2018/112369, filed on Oct. 29, 2018, which claims the benefit of Chinese Patent Application No. 201820263209.0, filed on Feb. 23, 2018, the entire disclosure of which is incorporated herein by reference.

TECHNICAL FIELD

The present disclosure relates to the field of liquid crystal display technologies, particularly to a substrate, a mask, a display panel and a display device.

BACKGROUND

A liquid crystal display device generally comprises an array substrate and a color filter substrate, and the color filter substrate comprises a display area and a non-display area. The color filter substrate comprises a color resistance layer to realize color display. The color resistance layer is not only located in the display area of the color filter substrate, it tends to extend to the non-display area of the color filter substrate.

SUMMARY

An embodiment of the present disclosure provides a substrate comprising a base substrate and a color resistance layer on the base substrate. The substrate comprises a display area and a non-display area, the color resistance layer comprises a weakening unit in the non-display area, the weakening unit is configured to weaken or disconnect connection between a first portion of the color resistance layer in the non-display area and a second portion of the color resistance layer in the display area, the first portion of the color resistance layer is on a first side of the weakening unit away from the display area.

In some embodiments, the weakening unit comprises an isolation structure, the isolation structure comprises an isolation groove or an isolation plate.

In some embodiments, the isolation structure extends along a straight line, a direction of a horizontal connection line between the display area and the non-display area is a lateral direction, and an extension direction of the isolation structure forms a non-90 degree angle with the lateral direction in a plane of the color resistance layer.

In some embodiments, the second portion of the color resistance layer in the display area comprises a first contact surface in contact with the isolation structure, the first contact surface forms a non-90 degree angle with the lateral direction.

In some embodiments, a contact surface of the isolation structure in contact with the color resistance layer is a curved surface.

In some embodiments, he color resistance layer further comprises a third portion in the non-display area, the third portion is on a second side of the weakening unit close to the display area, the third portion comprises a curved surface in contact with the isolation structure.

In some embodiments, a horizontal section of the curved surface is a parabola, and an opening of the parabola faces the display area.

In some embodiments, the color resistance layer comprises a plurality of the weakening units in the non-display area, the plurality of the weakening units are spaced apart from each other in a horizontal direction.

Another embodiment of the disclosure provides a mask for manufacturing the color resistance layer in the substrate according to any one of the foregoing embodiments. The mask comprises a first region corresponding to the weakening unit, the first region is an opaque region or a light transmitting region, light transmittance of regions of the mask other than the first region is opposite to light transmittance of the first region.

In some embodiments, a width of the first region of the mask is greater than 3 µm.

In some embodiments, the first region of the mask extends along a straight line, and an extension direction of the first region forms a non-90 degree angle with a horizontal direction.

In some embodiments, the first region of the mask is a curved region.

Other embodiments of the disclosure provide a display panel and a display device, the display panel comprising the substrate according to any one of the foregoing embodiments, the display device comprising the display panel according to the above embodiment.

DETAILED DESCRIPTION OF THE EMBODIMENTS

In order to make the objectives, technical solutions, and advantages of the present disclosure clearer, the present disclosure will be further described in detail below in conjunction with specific embodiments and with reference to the accompanying drawings.

It is to be noted that all the expressions involving "first" and "second" herein are intended to distinguish between two items which have similar names but are not the same entity or the same parameter. "First" and "second" are only for the purpose of facilitating description, and should not be construed as limitation to embodiments of the present disclosure.

Figure 1:
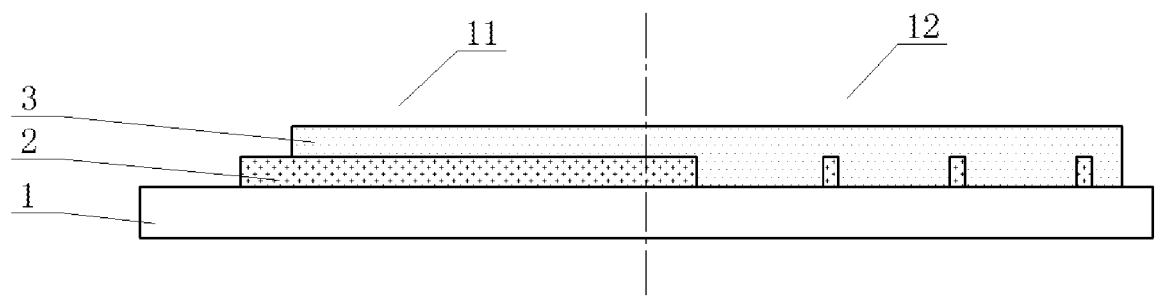
FIG. 1 and FIG. 2 are a sectional view and a top view of a color filter substrate known to inventors of the present application.
Figure 2:
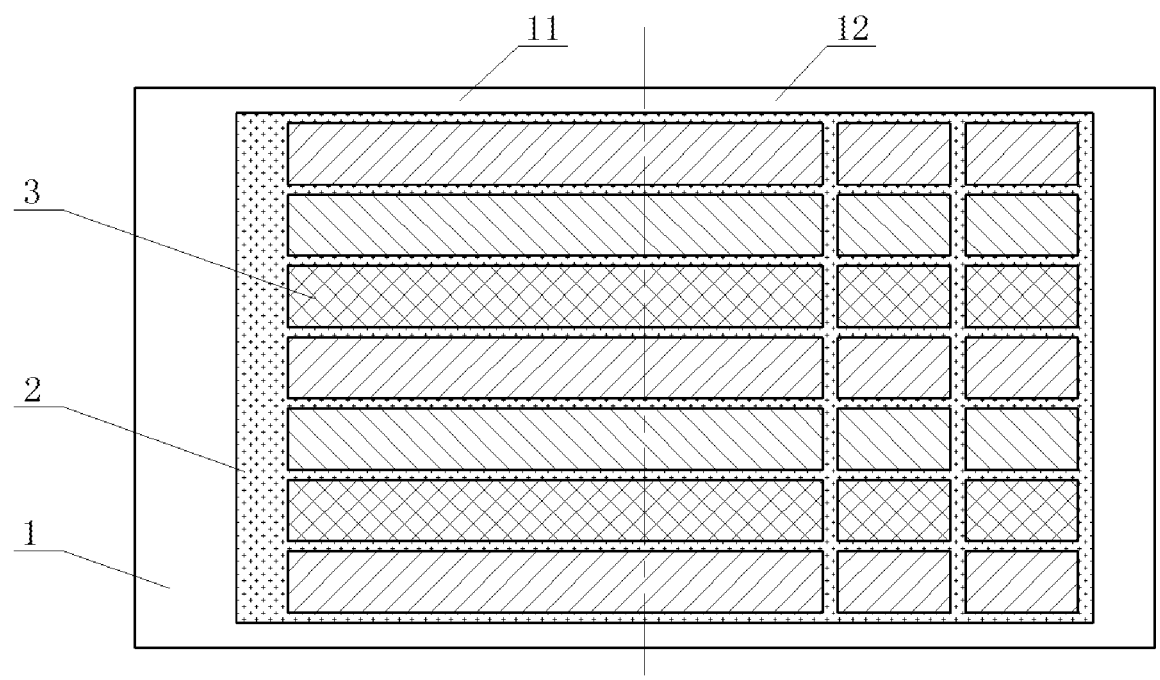

FIG. 1 and FIG. 2 are a sectional view and a top view of a color filter substrate known to the inventors of the present application, respectively. As shown in FIGS. 1 and 2, the color filter substrate comprises a display area 12 and a non-display area 11. A color resistance layer 3 on the substrate 1 covers both a display area 12 and a non-display area 11. The color resistance layer (hereinafter referred to as "Dummy RGB") in the non-display area 11 is an extension of an RGB pattern in the display area 12. Therefore, the Dummy RGB will directly affect the integrity of the RGB pattern in the active area (AA). The inventors have found that in the case where there is an RGB pattern strip in the non-display area 11, when the washing force or the blow-drying force from the air knife during the development process acts on the RGB pattern strip, the force will concentrate on the section of the RGB pattern strip, which is likely to peel off the Dummy RGB, resulting in release and absence of the Dummy RGB. Since the dummy RGB and the RGB pattern in the AA are of an integrated structure, the RGB pattern in the AA may be easily separated from the substrate along with the dummy RGB, which results in release of the color resistance layer in the AA and affecting product display. In other words, the inventors of the present application have found that the integrated structure of the color resistance layer of the substrate is prone to release and peeling of the color resistance layer in the display area during the development and washing process, which affects product quality.

An embodiment of the disclosure proposes an improved substrate, so that the color resistance layer in the non-display area will not bring about an excessive peeling force to the color resistance layer in the display area, thereby enabling the color resistance layer in the display area to be stable and effective.

Figure 3:
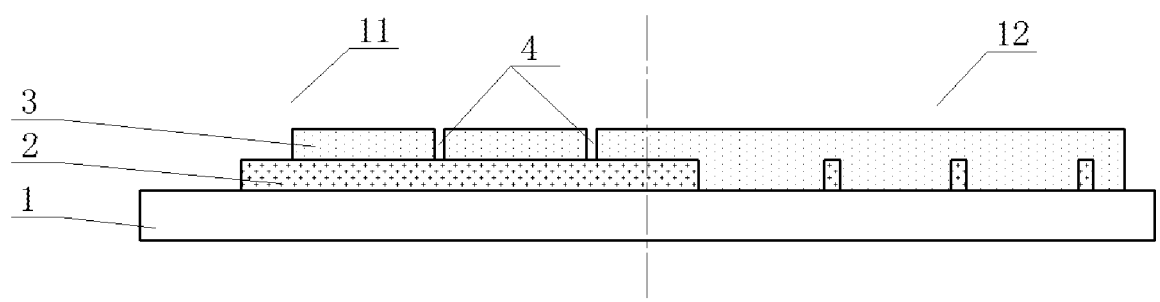
FIG. 3 is a sectional view of a substrate provided by an embodiment of the present disclosure.
Figure 4:
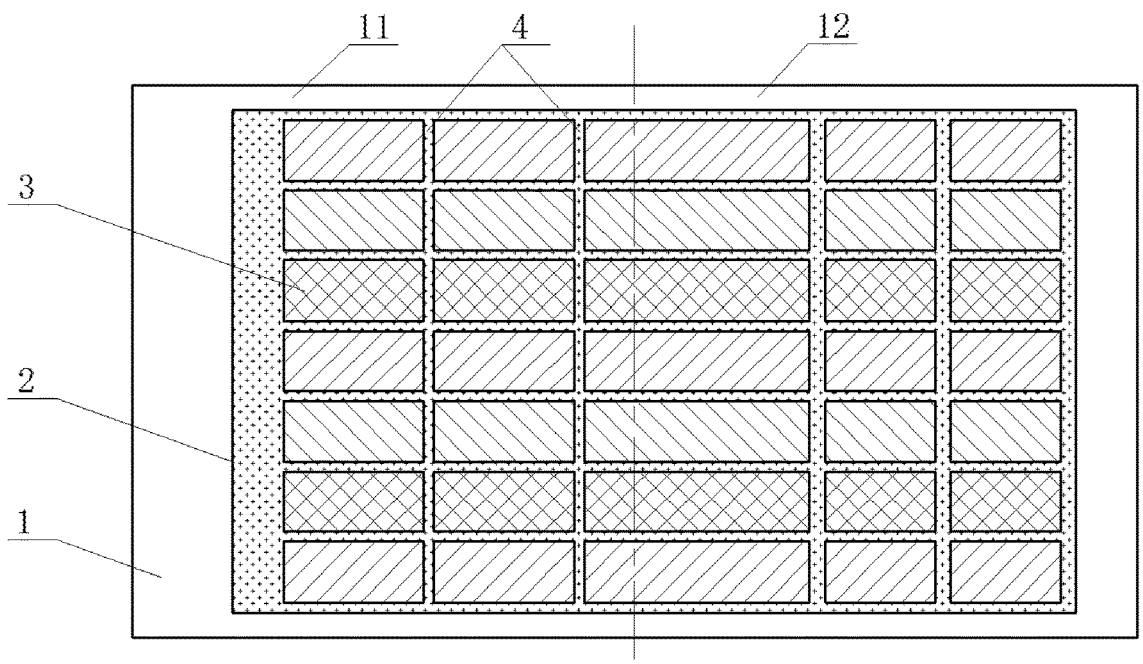
FIG. 4 is a top view of a substrate provided by an embodiment of the present disclosure.

FIG. 3 and FIG. 4 are a sectional view and a top view of a substrate provided by an embodiment of the present disclosure, respectively. As shown in FIGS. 3 and 4, the substrate comprises a base substrate 1 and a color resistance layer 3 on the base substrate 1. A black matrix 2 is provided between the base substrate 1 and the color resistance layer 3, and the bottom of the color resistance layer at an edge area of the substrate is completely covered by the black matrix, so that the substrate has a display area 12 and a non-display area 11. The color resistance layer in the non-display area 11 comprises a weakening unit 4 for weakening or disconnecting connection between the color resistance layer in the non-display area 11 away from the display area 12 and the color resistance layer in the display area 12. In this way, connection between the color resistance layer in the non-display area that is easily peeled off and the color resistance layer in the display area is weakened or completely cut off, so the color resistance layer in the display area is not likely to be peeled off along with the color resistance layer in the non-display area.

According to an embodiment of the present disclosure, the weakening unit comprises an isolation structure, a partially fractured structure, or other structures capable of weakening the connection between the color resistance layer in the non-display area and the color resistance layer in the display area, which is not limited herein. For example, the partially fractured structure may comprise a local incision in the color resistance layer corresponding to the non-display area, and this local incision may become larger during the separation of the color resistance layer in the non-display area from the base substrate due to a shearing force resulting from the separation and further disconnects the connection between the color resistance layer in the non-display area and the color resistance layer in the display area.

In some embodiments, the isolation structure comprises an isolation groove or an isolation plate. As shown in FIG. 3, an isolation groove may be directly formed in the color resistance layer corresponding to the non-display area, so that the color resistance layers on two sides of the isolation groove are disconnected from each other, which can prevent the color resistance layers on two sides of the isolation groove from interacting with each other. In another embodiment, an isolation plate may be provided so that the color resistance layer in the non-display area and the color resistance layer in the display area are isolated from each other. For example, a protruding plate may be arranged on the black matrix corresponding to the non-display area firstly, so that the color resistance layer fabricated later will be separated by the protruding plate.

In some embodiments, the width of the isolation structure is less than a preset value. That is, the width of the isolation structure is set as small as possible so as to reduce the influence of the blow-drying force of the air knife on a photoresist at the location of the isolation structure, and prevent the photoresist at the location of the isolation structure from falling off.

It is to be noted that the substrate mentioned in the present disclosure may be either a color filter substrate or an array substrate.

The substrate described in the above embodiment of the disclosure is provided with a weakening unit in the color resistance layer corresponding to the non-display area to weaken or disconnect connection between the color resistance layer in the non-display area away from the display area and the color resistance layer in the display area. In this way, during the process of development and washing for the substrate, even if the color resistance layer in the non-display area is separated from the substrate, since the color resistance layer in the display area has no strong connection therewith, the color resistance layer in the display area will not be peeled off together, which ensures the safety and reliability of the color resistance layer in the display area. Therefore, the substrate described in the foregoing embodiment may prevent the color resistance layer in the display area from being peeled off from the base substrate along with the color resistance layer in the non-display area during the development and washing process, thereby reducing a risk of release of the color resistance layer in the display area and improving product quality. In addition, the substrate proposed in the foregoing embodiment is only partially modified with respect to the color resistance layer, which does not increase the process difficulty and cost, and is easy to popularize and implement.

It is to be noted that the color resistance layer in the non-display area described in the foregoing embodiment and subsequent embodiments may correspond to different sub-pixel areas such as R sub-pixel areas, G sub-pixel areas and B sub-pixel areas. That is, the respective color resistance layer for every single sub-pixel area may be provided with a weakening unit, the weakening units for adjacent sub-pixel areas may be a unified structure or comprise different independent structures, as long as they are capable of weakening or disconnecting connection between the color resistance layer in the non-display area and the color resistance layer in the display area.

Figure 5:
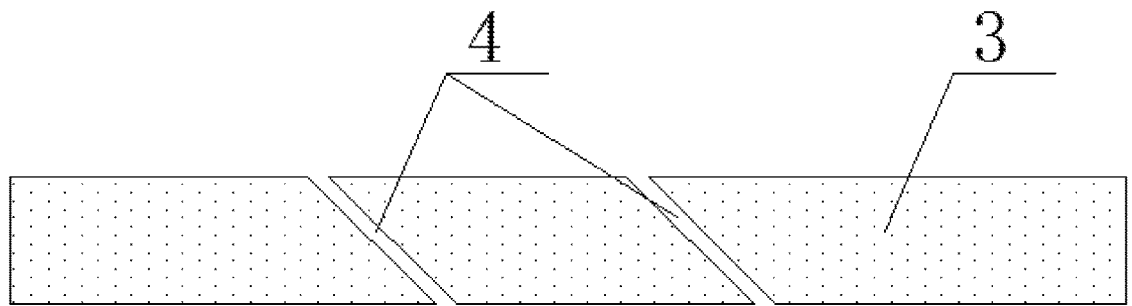
FIG. 5 is a partial top view of a substrate provided by another embodiment of the present disclosure.

FIG. 5 is a partial top view of a substrate provided by another embodiment of the disclosure. As shown in FIG. 5, the direction of a connection line between the display area and the non-display area in the horizontal direction is defined as a lateral direction. The isolation structure 4 extends along a straight line, and the extension direction of the isolation structure forms a non-90 degree angle with the lateral direction in a plane of the color resistance layer 3. That is, the extension direction of the isolation structure is not perpendicular to the lateral direction. In this way, during the process of peeling off the color resistance layer in the non-display area, it is possible to gradually disconnect connection between the color resistance layer in the non-display area and the color resistance layer in the display area to form a shearing force effect, which can greatly improve the weakening function and effect of the isolation structure.

In some embodiments, the color resistance layer in the display area comprises a first contact surface in contact with the isolation structure, and the first contact surface forms a non-90 degree angle with the lateral direction. In other words, the isolation structure forms a non-90 degree angle with the color resistance layer in the display area, which can improve the isolation and weakening effect. Furthermore, since the contact surface of the color resistance layer in the display area is inclined with respect to the lateral direction (forming a non-90 degree angle with the lateral direction), if a subsequent washing force produces a peeling force on the color resistance layer in the display area, the contact surface may serve as a force guiding and unloading structure, which can weaken the peeling force caused by the washing force, thereby reducing a risk of peeling off the color resistance layer in the display area.

Figure 6:
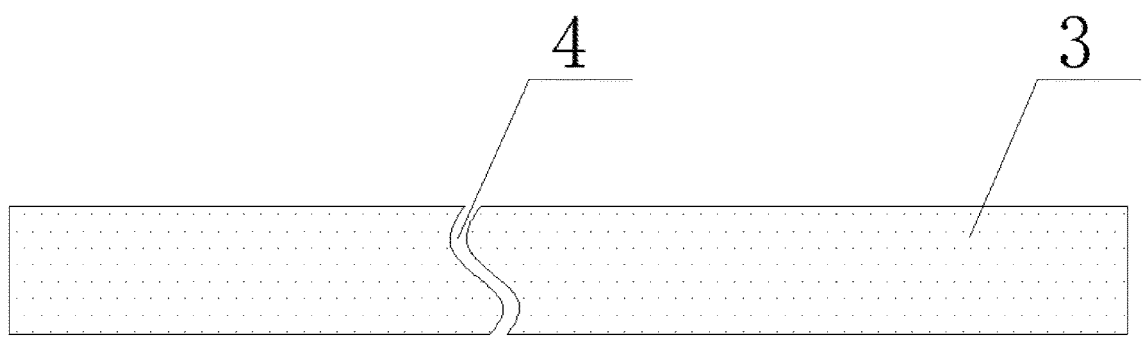
FIG. 6 is a partial top view of a substrate provided by a further embodiment of the present disclosure.

FIG. 6 is a partial top view of a substrate provided by a further embodiment of the present disclosure. Different from the embodiment shown in FIG. 5, in this embodiment, the contact surface between the isolation structure 4 and the color resistance layer 3 in the display area is a curved surface. That is, the isolation structure 4 is of a curved structure. This on the one hand increases the length of the isolation structure and further improves the isolation effect. Moreover, with the isolation structure of a curved structure, the contact surface of the color resistance layer close to the display area that contacts the isolation structure is a curved surface, so that when the subsequent washing force or blow-drying force is applied to the color resistance layer close to the display area, the curved contact surface may play a good force guiding role, which greatly reduces a risk of peeling off the color resistance layer in the display area.

Figure 7:
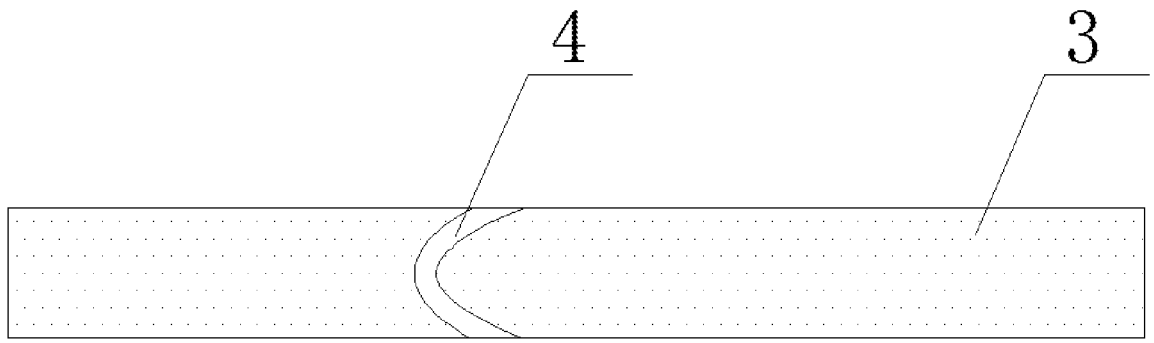
FIG. 7 is a partial top view of a substrate provided by yet another embodiment of the present disclosure.

FIG. 7 is a partial top view of a substrate provided by yet another embodiment of the disclosure. The contact surface between the isolation structure 4 and the color resistance layer 3 in the display area is a curved surface, a horizontal section of the curved surface is a parabola, and the opening of the parabola faces the display area. This enables the end face of the color resistance layer in the display area 3 close to the isolation structure to have a better effect of guiding and eliminating the washing force or blow-drying force.

In some embodiments, a plurality of weakening units may be arranged in the color resistance layer in the non-displaying area along the lateral direction, this may further reduce a risk of peeling off the color resistance layer in the display area.

Figure 8:
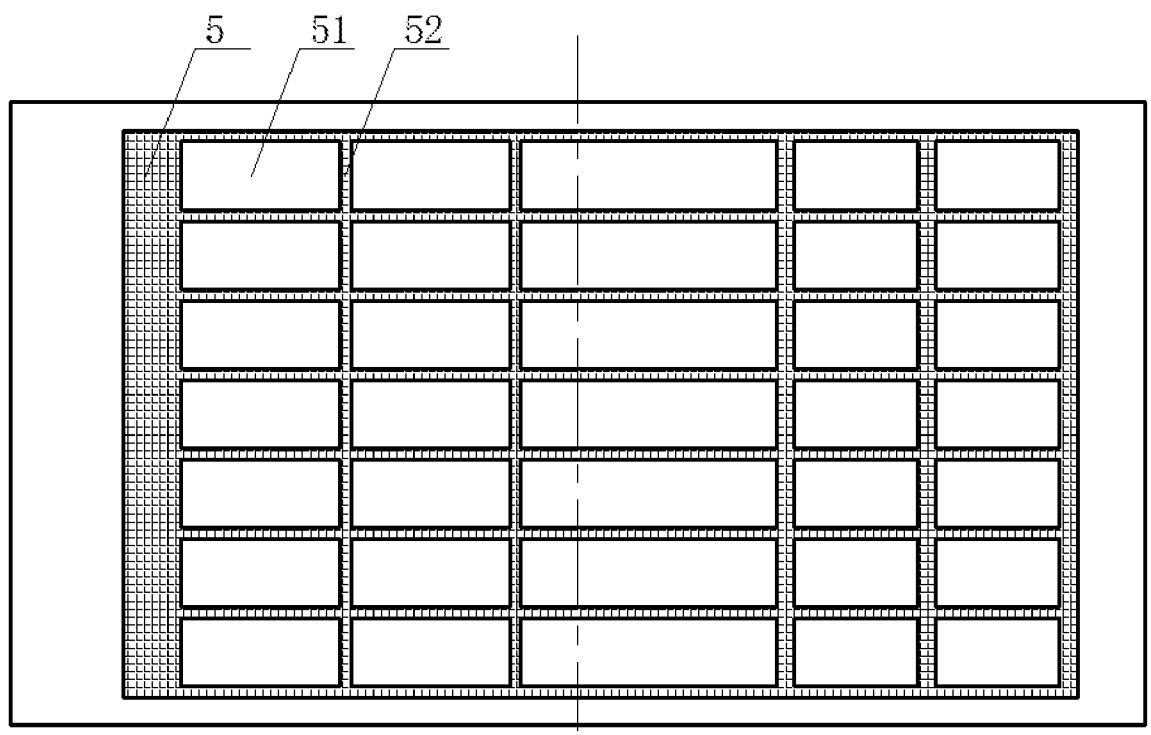
FIG. 8 is a schematic structural view of a mask provided by still another embodiment of the present disclosure.

FIG. 8 is a schematic structural view of a mask provided by an embodiment of the disclosure. A mask 5 is used to fabricate a color resistance layer of the substrate according to any one of the foregoing embodiments. The mask 5 comprises light transmitting regions 51 and opaque regions 52. Due to different properties of different photoresists, it is required to perform different designs for the light transmitting regions 51 and the opaque regions 52 of the mask 5. Specifically, if a negative photoresist is employed, a region (herein referred to as "a first region") of the mask corresponding to the weakening unit is an opaque region 52; if a positive photoresist is used, a region of the mask corresponding to the weakening unit is a light transmitting region. That is, the light transmittance of regions of the mask other than the first region is opposite to that of the first region. In this way, a whole color resistance layer can be divided into isolated portions by means of the arrangement of the opaque regions or light transmitting regions of the mask corresponding to the weakening unit, which can be designed according to the property of the photoresist to be employed. This will not cause a complicated and high-cost process.

In some embodiments, the opaque region or the light transmitting region of the mask corresponding to the weakening unit has a width greater than 3 μm. This is advantageous for achieving the effect of isolating the color resistance layer in the non-displaying area from the color resistance layer in the displaying area during the exposure and development process.

Further, according to the isolation structures of the substrate in FIG. 5, FIG. 6 and FIG. 7, it can be appreciated that the opaque region or the light transmitting region of the mask corresponding to the weakening unit may be a region extending along a straight line and forming a non-90 degree angle with the lateral direction as shown in FIG. 5, or a curved region as shown in FIG. 6 or 7. Compared with the embodiment shown in FIG. 8, a mask of a further embodiment has a similar structure with the mask of FIG. 8, only some modifications can be made due to the different weakening units.

A further embodiment of the present disclosure provides a display panel comprising the substrate according to any one of the foregoing embodiments. Further, a further embodiment of the present disclosure provides a display device comprising the display panel described above. Since the display panel or the display device includes relevant features of the above-described embodiments regarding the substrate, the same technical effect can be achieved for the display panel or the display device, which will not be repeated herein.

It is to be understood by a person having an ordinary skill in the art that the discussion of any of the foregoing embodiments is merely exemplary and is not intended to imply that the scope of the present disclosure, including the claims, is limited to them. With the ideas revealed by the present disclosure, the technical features in the foregoing embodiments or different embodiments may be combined, and there exist many different variances in different aspects, which are not provided in details for the sake of brevity. Therefore, any omissions, modifications, equivalent replacements, improvements, etc. made within the spirit and principles of the disclosure should be encompassed within the protection scope of the disclosure.

The invention claimed is:

1. A substrate comprising:
   a base substrate, and
   a color resistance layer on the base substrate,
   wherein the substrate comprises a display area and a non-display area, the color resistance layer comprises a plurality of first RGB pattern strips in the display area and a plurality of second RGB pattern strips respectively extending from the plurality of first RGB pattern strips in the display area to the non-display area,
   wherein each second RGB pattern strip of the plurality of second RGB pattern strips comprises multiple isolation structures;
   configured to weaken or disconnect connection between a first portion of the color resistance layer in the non-display area and a second portion of the color resistance layer in the display area,
   wherein each isolation structure of the multiple isolation structures comprises an isolation groove or an isolation plate such that each second RGB pattern strip of the plurality of second RGB pattern strips forms a plurality of dummy sub pixel patterns.

2. The substrate according to claim 1, wherein at least one of the multiple isolation structures extends along a straight line, a direction of a horizontal connection line between the display area and the non-display area is a lateral direction, and an extension direction of at least one of the multiple isolation structures forms a non-90 degree angle with the lateral direction in a plane of the color resistance layer.

3. The substrate according to claim 2, wherein the second portion of the color resistance layer in the display area comprises a first contact surface in contact with at least one of the multiple isolation structures, the first contact surface forms a non-90 degree angle with the lateral direction.

4. The substrate according to claim 1, wherein a contact surface of at least one of the multiple isolation structures in contact with the color resistance layer is a curved surface.

5. The substrate according to claim 4, wherein the color resistance layer further comprises a third portion in the non-display area, the third portion is on a second side of the close to the display area, the third portion comprises a curved surface in contact with at least one of the multiple isolation structures.

6. The substrate according to claim 5, wherein a horizontal section of the curved surface is a parabola, and an opening of the parabola faces the display area.

7. The substrate according to claim 4, wherein a horizontal section of the curved surface is a parabola, and an opening of the parabola faces the display area.

8. The substrate according to claim 1, wherein the multiple isolation structures are spaced apart from each other in a horizontal direction.

9. A mask for manufacturing the color resistance layer in the substrate according to claim 1, wherein the mask comprises a first region corresponding to each isolation structure of the multiple isolation structures, the first region is an opaque region or a light transmitting region, light transmittance of regions of the mask other than the first region is opposite to light transmittance of the first region.

10. The mask according to claim 9, wherein a width of the first region of the mask is greater than 3 μm.

11. The mask according to claim 9, wherein the first region of the mask extends along a straight line, and an extension direction of the first region forms a non-90 degree angle with a horizontal direction.

12. The mask according to claim 9, wherein the first region of the mask is a curved region.

13. A display panel comprising the substrate according to claim 1.

14. A display device comprising the display panel according to claim 13.

15. The display panel according to claim 13, wherein at least one of the multiple isolation structures extends along a straight line, a direction of a horizontal connection line between the display area and the non-display area is a lateral direction, and an extension direction of at least one of the multiple isolation structures forms a non-90 degree angle with the lateral direction in a plane of the color resistance layer.

16. The display panel according to claim 13, wherein a contact surface of at least one of the multiple isolation structures in contact with the color resistance layer is a curved surface.

17. The display panel according to claim 16, wherein the color resistance layer further comprises a third portion in the non-display area, the third portion is on a second side of the close to the display area, the third portion comprises a curved surface in contact with at least one of the multiple isolation structures.

* * * * *